(12) United States Patent
Kim et al.

(10) Patent No.: US 8,842,098 B2
(45) Date of Patent: Sep. 23, 2014

(54) CAPACITIVE STYLUS PEN HAVING TRANSFERRING MEMBER PARTIALLY WITHIN BODY PORTION

(75) Inventors: Tae-Yang Kim, Seoul (KR); Tae-Jin Yoon, Gyeonggi-do (KR); Hyun-Jun Park, Gyeongsangbuk-do (KR); Sang-Kyu Lee, Gyeonggi-do (KR); Nam-Shik Song, Gyeonggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 215 days.

(21) Appl. No.: 13/299,858

(22) Filed: Nov. 18, 2011

(65) Prior Publication Data

US 2012/0139879 A1 Jun. 7, 2012

(30) Foreign Application Priority Data

Dec. 1, 2010 (KR) ........................ 10-2010-0121219

(51) Int. Cl.
*G06F 3/033* (2013.01)
*G06F 3/044* (2006.01)
*G06F 3/0354* (2013.01)

(52) U.S. Cl.
CPC ............ *G06F 3/03545* (2013.01); *G06F 3/044* (2013.01)
USPC ........................................................ 345/179

(58) Field of Classification Search
CPC ................................................. G06F 3/03545
USPC .................. 345/179; 178/18.06, 19.01, 19.03
See application file for complete search history.

(56) References Cited

U.S. PATENT DOCUMENTS

| 4,902,858 | A  | * | 2/1990 | Yamanami et al. | ........ 178/18.07 |
|---|---|---|---|---|---|
| 6,737,591 | B1 | * | 5/2004 | Lapstun et al. | ............ 178/19.05 |
| 6,882,340 | B2 | * | 4/2005 | Kanzaki et al. | ............... 345/179 |
| 7,657,255 | B2 | * | 2/2010 | Abel et al. | ................. 455/414.1 |
| 2003/0128195 | A1 | * | 7/2003 | Banerjee et al. | ............. 345/179 |
| 2005/0162411 | A1 | * | 7/2005 | Berkel van | ..................... 345/179 |
| 2009/0050378 | A1 | * | 2/2009 | Lee | ............................ 178/19.01 |
| 2009/0251442 | A1 | * | 10/2009 | Nakata | ........................... 345/179 |
| 2010/0053120 | A1 | * | 3/2010 | Chang et al. | .................. 345/179 |

* cited by examiner

*Primary Examiner* — Long D Pham
(74) *Attorney, Agent, or Firm* — Cha & Reiter, LLC

(57) ABSTRACT

A capacitive stylus pen for a portable terminal includes a body portion formed of a synthetic resin material extending in a longitudinal direction; a sensing member provided in an inner side of the body portion to sense a current of a human's body; a transferring member formed of a conductive material and provided in an end of the body portion to be connected to the sensing member, and a manipulating member provided in an end of the transferring member, wherein the manipulating member is manufactured of conductive rubber and contacts a touch screen according to user's manipulation, and a Near Field Communication (NFC) is embedded in the body portion to perform wireless communication with the portable terminal, thereby configuring a wireless headset with the capacitive stylus pen.

8 Claims, 3 Drawing Sheets

CAPACITIVE STYLUS PEN HAVING TRANSFERRING MEMBER PARTIALLY WITHIN BODY PORTION

CLAIM OF PRIORITY

This application claims the benefit under 35 U.S.C. §119(a) of a Korean Patent Application filed in the Korean Intellectual Property Office on Dec. 1, 2010 and assigned Serial No. 10-2010-0121219, the entire disclosure of which is hereby incorporated by reference.

BACKGROUND OF THE INVENTION

1. Field of the Invention

The present invention relates to a stylus pen, and more particularly to a capacitive stylus pen available for manipulation of a capacitive touch screen.

2. Description of the Related Art

A stylus pen is a kind of tool for manipulating an electronic or communication device in which a touch screen is installed, such as a Personal Digital Assistant (PDA), a cellular phone, a palm Personal Computer (PC), etc. When a manipulating member, a so-called tip, formed at an end of the stylus pen contacts the touch screen, the electronic or communication device operates responsively, essentially enabling an input of user desired information to the electronic or communication device. In many related applications, icons or menus are displayed on the touch screen, and upon user's selection of a desired icon or menu with the stylus pen, the electronic or communication device performs a corresponding function associated with the icon or menu.

The continued growth and popularity of portable terminals for mobile communication, e.g., Smartphone's and other hand-held electronic devices, as well as the increased commercialization of multimedia services accessed using portable terminals has seen a commensurate increase in the demand for various display devices and the input devices for inputting data therethrough. To meet such growing demands, and the demands for rendering the portable terminals more compact and lightweight, touch screens are increasingly used to operate concurrently both as an input device and a display device.

Touch screens may be classified into resistive touch screens and capacitive touch screens. The resistive touch screen generates an input signal by sensing a position on the touch screen at which a user applies a touching force causing contact between two resistive screen layers. The capacitive touch screen generates an input signal by sensing a position on the touch screen at which a user applies a touch causing a change in detected capacitance from a micro-current flowing through a user's body, i.e., the user's finger. The capacitive touch screen, when compared to the resistive touch screen, provides a smoother manipulation feeling and action, e.g., scroll. For that matter, a capacitive touch screen allows for multi-touching contact and manipulation of various touch screen positions or points at the same time. Thus, the user may feel that a portable terminal using a capacitive touch screen is more elegant than a portable terminal using a resistive touch screen.

As resistive touch screens are responsive to an input signal from a user's manipulating force, they may be manipulated by use of other tools or body portions, such as a pen, a pencil, or a nail, as well as a finger. On the other hand, the capacitive touch screen operates by a human's micro-current, limiting manipulation using a general tool such as a pen or a pencil. This results in a need for a separate tool for manipulating the capacitive touch screen, such as a stylus pen, which is able to transfer the human's micro-current to the touch screen.

Moreover, with the combination of a multimedia function as well as a voice communication function in portable terminals, a need arises for the use of a wireless headset based on Near Field Communication (NFC), such as Bluetooth in such portable terminals.

The wireless headset, however, has to be carried together with the portable terminal, and the portable terminal having a touch screen mounted thereon has to be accompanied by a separate stylus pen. In order to realize a compact and convenient solution to these requirements, effort has been exerted to integrate the stylus pen and the wireless headset. However, as the stylus pen for manipulating the capacitive touch screen needs to be made of a conductive material to transfer the human's micro-current to the touch screen, such conductive material construction tends to hinder transmission and reception functions of the wireless headset. In an effort to secure an installation space of the wireless headset, a portion made of synthetic resin as well as a portion made of the conductive material are added to the stylus pen. But these added portions have the effect of increasing the diameter or length of the stylus pen thus hindering miniaturization.

SUMMARY OF THE INVENTION

Accordingly, an aspect of the present invention is to provide a stylus pen for a capacitive touch screen, which is easy to carry.

Another aspect of the present invention is to provide a capacitive stylus pen which facilitates a wireless communication function even when having a wireless headset embedded therein.

Moreover, another aspect of the present invention is to provide a capacitive stylus pen which is easy to miniaturize even when having a wireless headset embedded therein.

According to an aspect of the present invention, there is provided a capacitive stylus pen for a portable terminal. The capacitive stylus pen includes a body portion formed of a synthetic resin material, the body portion extending in a longitudinal direction, a sensing member provided in an inner side of the body portion to sense a current of a human's body, a transferring member formed of a conductive material and provided in an end of the body portion to be connected to the sensing member, and a manipulating member provided in an end of the transferring member that is manufactured of conductive rubber and contacts a touch screen according to user's manipulation.

The sensing member may include a metal layer deposited on an inner circumferential surface of the body portion, or a conductive plate provided in the inner side of the body portion.

The capacitive stylus pen may further include a binding hole provided in the end of the transferring member and a binding member provided in the end of the body portion. At least an end portion of the transferring member is inserted into the end of the body portion. The binding member is engaged with the binding hole to fix the transferring member to the body portion.

The binding member may include a first screw engaged from an outer side of the body portion. Alternatively, the binding member may include a binding protrusion formed on the inner circumferential surface of the body portion.

The capacitive stylus pen may further include a grip member coupled to enclose at least the transferring member between the body portion and the manipulating member.

The grip member may be coupled to further enclose a portion of the body portion and a portion of the manipulating member.

The grip member may be formed of a conductive material.

The grip member may further include a first receiving portion for receiving a portion of the transferring member, a second receiving portion for receiving a portion of the manipulating member, and a barrier provided between the first receiving portion and the second receiving portion.

The capacitive stylus pen may further include a second screw engaged to the transferring member from the second receiving portion through the barrier.

The second screw may be formed of a conductive material, and the manipulating member may contact the second screw as the manipulating member is received in the second receiving portion.

The capacitive stylus pen may further include a second transferring member disposed in the second receiving portion and a connecting member extending from the transferring member to the second receiving portion through the barrier, wherein the second transferring member is engaged to the connecting member.

The second transferring member may be formed of a conductive material, and the manipulating member may be coupled to the second transferring member in the second receiving portion.

According to an aspect of the present invention, there is provided a capacitive stylus pen for a portable terminal which includes: a body portion formed of a synthetic resin material and extending in a longitudinal direction; a conductive sensing member provided in an inner side of the body portion to sense a current of a human's body upon gripping the body portion; a transferring member formed of a conductive material and provided in an end of the body portion in connection with the sensing member; a manipulating member made of conductive rubber and provided in an end of the transferring member for pressing against and contacting a touch screen of the portable terminal; and a conductive grip member arranged to enclose the transferring member, a portion of the body portion and a portion of the manipulating member.

BRIEF DESCRIPTION OF THE DRAWINGS

The above and other features and advantages of exemplary embodiments of the present invention will be more apparent from the following detailed description taken in conjunction with the accompanying drawings, in which.

DETAILED DESCRIPTION OF THE INVENTION

Hereinafter, exemplary embodiments of the present invention will be described in detail with reference to the accompanying drawings. A detailed description of known functions and configurations will be omitted when it may unnecessarily obscure the subject matter of the present invention.

Figure 1:
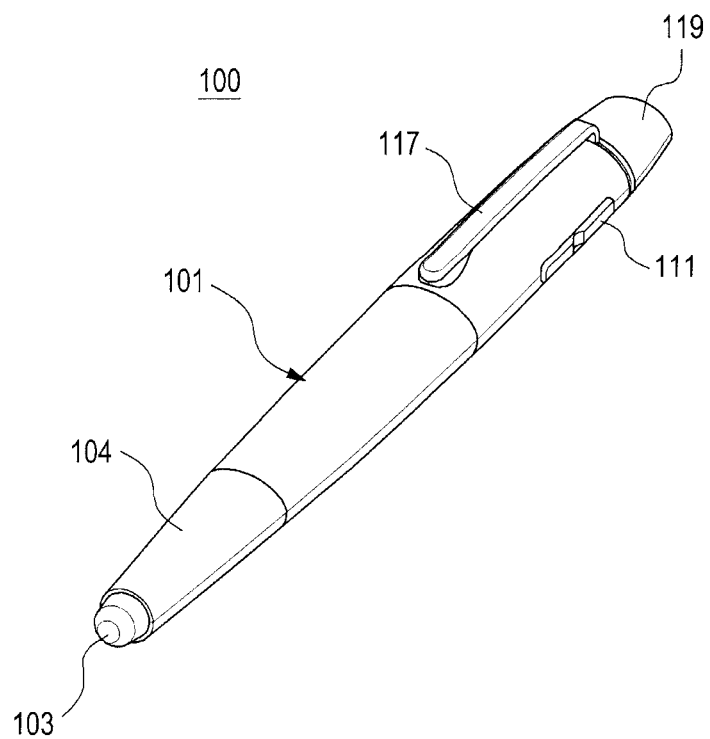
FIG. 1 is a perspective view of a capacitive stylus pen according to an exemplary embodiment of the present invention.
Figure 2:
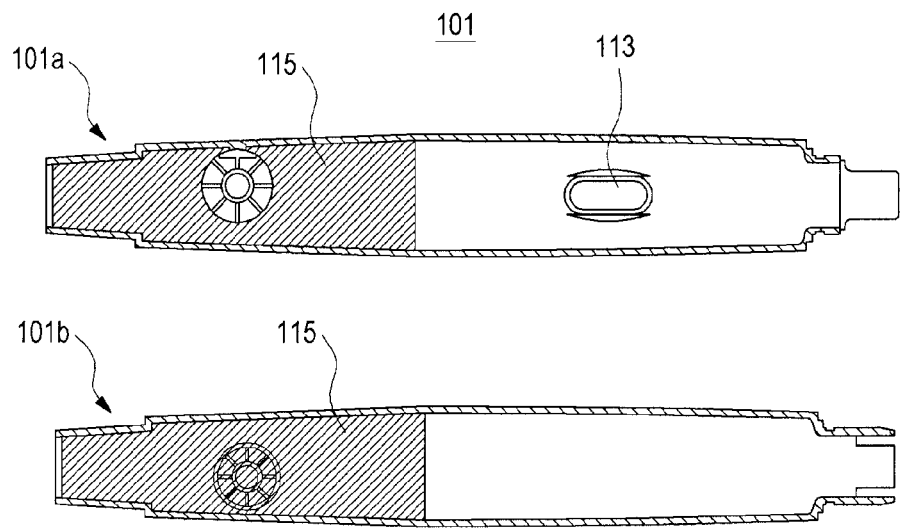
FIG. 2 is a plane view of a body portion of a capacitive stylus pen shown in FIG. 1.
Figure 3:
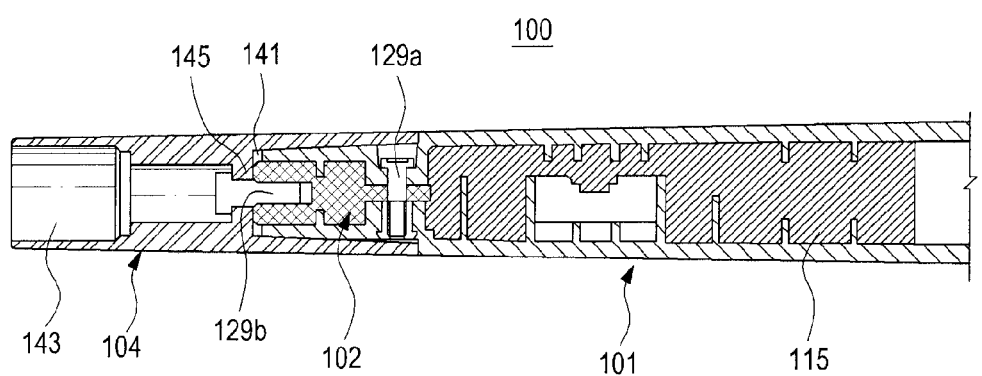
FIG. 3 is a cross-sectional view of a capacitive stylus pen shown in FIG. 1.

As shown in FIGS. 1 through 3, a capacitive stylus pen 100 according to an exemplary embodiment of the present invention (which will hereinafter be referred to as a 'stylus pen') includes a body portion 101, a sensing member 115, a transferring member 102, and a manipulating member 103. The body portion 101 is manufactured of synthetic resin, and the sensing member 115, the transferring member 102, and the manipulating member 103 are manufactured of a conductive material, respectively.

The body portion 101 is a portion which a user, when using the stylus pen 100, substantially holds by hand. The body portion 101 may serve as a housing for receiving a Near Field Communication (NFC) device (not shown) such as Bluetooth module. For smooth wireless communication between the NFC device received in the body portion 101 and a portable terminal, the body portion 101 is preferably manufactured of a synthetic resin material.

The body portion 101 is formed by coupling a front case 101a and a rear case 101b. On an upper end portion of the body portion 101 are provided a clip 117 and a fixing cap 119. The clip 117 extends downward from the upper end portion of the body portion 101 to provide a means for allowing a user to have the stylus pen 100 on a collar, etc., when the user carries the stylus pen 100. The fixing cap 119 covers and fixes upper end portions of the front case 101a and the rear case 101b which are coupled to each other.

A 2-way key 111 is provided on an outer circumferential surface of the body portion 101. When an NFC device is embedded in the body portion 101, through which the stylus pen 100 is configured as a wireless headset, the 2-way key 111 may be used as a volume control key. To install the 2-way key 111, a through-hole 113 is formed in the front case 101a.

Although not shown, a transmitter and a receiver are provided on the outer circumferential surface of the body portion 101 in an opposite side to the clip 117. When the transmitter and the receiver are provided in the body portion 101, the user wirelessly connects the portable terminal with the stylus pen 100 through the NFC device embedded in the body portion 101 to perform voice communication using the transmitter and the receiver. In other words, by installing the NFC device, the transmitter, and the receiver in the body portion 101, the stylus pen 100 is used as a hand-free device. As mentioned previously, the body portion 101 is manufactured of a synthetic resin material to allow the embedded NFC device to perform smooth transmission and reception with the portable terminal.

The sensing member 115 is intended to sense a microcurrent flowing through a user's body when the user uses the stylus pen 100. To this end, the sensing member 115 is provided inside the body portion 101 and is manufactured of a conductive material. To provide the sensing member 115 inside the body portion 101, a metal layer is formed by depositing metal formed of a conductive material on an inner circumferential surface of the body portion 101, or by attaching a metal foil formed of a conductive material onto the inner circumferential surface of the body portion 101. Alternatively, a sensing member 115 is provided by simply disposing a conductive plate inside the body portion 101. While the conductive plate may be a flat plate, the conductive plate may alternatively be formed with a curved surface to correspond to the shape of the inner circumferential surface of the body portion 101, thus providing the sensing member 115.

In the current embodiment, the sensing member 115 is provided by forming the metal layer on the inner circumferential surface of the body portion 101, more specifically, from a lower end portion of the body portion 101, nearly to a center portion of the body portion 101. This is intended to facilitate transmission and reception of electric waves when the NFC device is disposed inside the body portion 101. In other words, the sensing member 115 is formed from the lower end portion to the center portion of the body portion 101, and the NFC device is disposed on the upper end portion of the body portion 101.

When the user holds the outer circumferential surface of the body portion 101, corresponding to a portion in which the sensing member 115 is provided, capacitive coupling is formed between the user's body and the sensing member 115, such that the sensing member 115 is conducted by the micro-current of the user's body.

The transferring member 102 is intended to electrically connect the manipulating member 103 to the sensing member 115. As mentioned previously, the transferring member 102 is manufactured of a conductive material. An end of the transferring member 102 is inserted into an end of the body portion 101, more specifically, a lower end of the body portion 101. A binding hole is provided at the end of the transferring member 102, and a binding member 129a is provided in the body portion 101. In the current embodiment, a first screw engaged from an outer side of the body portion 101 is used as the binding member 129a. When the end of the transferring member 102 is inserted into the end of the body portion 101, the binding member 129a is engaged with the body portion 101 and the binding hole, thus fixing the transferring member 102 to the body portion 101. In FIG. 3, the binding member 129a is engaged with the binding hole which is not indicated by a reference numeral. Hence, the transferring member 102 is coupled with the body portion 101 and at the same time, connected to the sensing member 115.

The manipulating member 103 is manufactured of conductive rubber and is connected to another end of the transferring member 102. Hence, the manipulating member 103 is electrically connected with the sensing member 115 through the transferring member 102, and the micro-current of the user's body sensed by the sensing member 115 is transferred to the manipulating member 103.

Since the manipulating member 103 has elasticity, it may be manufactured to enclose the transferring member 102 or the body portion 101. In the current embodiment, a separate grip member 104 is provided to enclose a portion of the manipulating member 103 from the lower end portion of the body portion 101.

The grip member 104 is provided with a barrier 145 in an internal space thereof. A first receiving portion 141 and a second receiving portion 143 are formed in the internal space of the grip member 104. The first receiving portion 141 receives the transferring member 102, more specifically, the lower end portion of the body portion 101. The second receiving portion 143 receives a portion of the manipulating member 103. The stylus pen 100 further includes a second screw or binding member 129b, which is engaged to the transferring member 102 from the second receiving portion 143 through the barrier 145. As the second screw 129b is engaged to the transferring member 102 through the barrier 145, the grip member 104 is fixed to the body portion 101.

Although not specifically described, ribs coupled to an outer circumferential surface of the transferring member 102 are formed on an inner circumferential surface of the lower end portion of the body portion 101, and the transferring member 102 is fixed to the body portion 101 by means of the binding member 129a. In addition, the grip member 104 is fixed to the transferring member 102 by means of the second screw or binding member 129b, such that the grip member 104 is fixed to the body portion 101. Moreover, the lower end portion of the body portion 101 is also received in the first receiving portion 141, thereby providing a firm assembly structure.

The manipulating member 103 is received in the second receiving portion 143 and contacts the second screw or binding member 129b, thus being electrically connected to the transferring member 102. As previously mentioned, the manipulating member 103 is arranged to enclose the lower end portion of the body portion 101 and connected to the transferring member 102 in an inner side thereof. In a preferred embodiment, the grip member 104 is installed to make the exterior of the stylus pen 100 more elegant.

If the grip member 104 is manufactured of a conductive material, the micro-current of the user's body is transferred directly to the manipulating member 103 when the user uses the stylus pen 100 while gripping the grip member 104. Although the grip member 104 is manufactured of a conductive material, it does not hinder communication of the NFC device embedded in the body portion 101 because the grip member 104 is coupled to the lower end portion of the body portion 101 in the outer side of the body portion 101.

Figure 4:
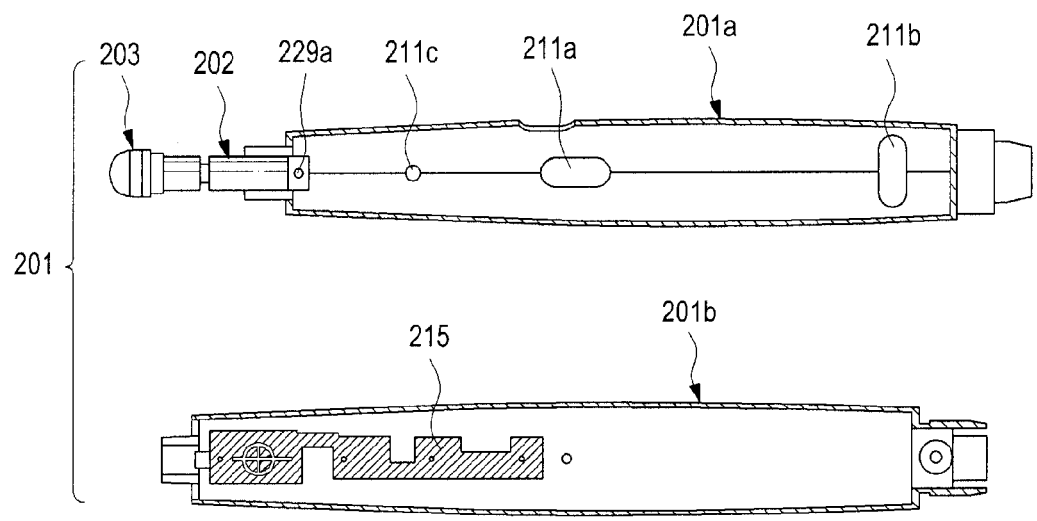
FIG. 4 is a plane view of a body portion of a capacitive stylus pen according to another exemplary embodiment of the present invention.
Figure 5:
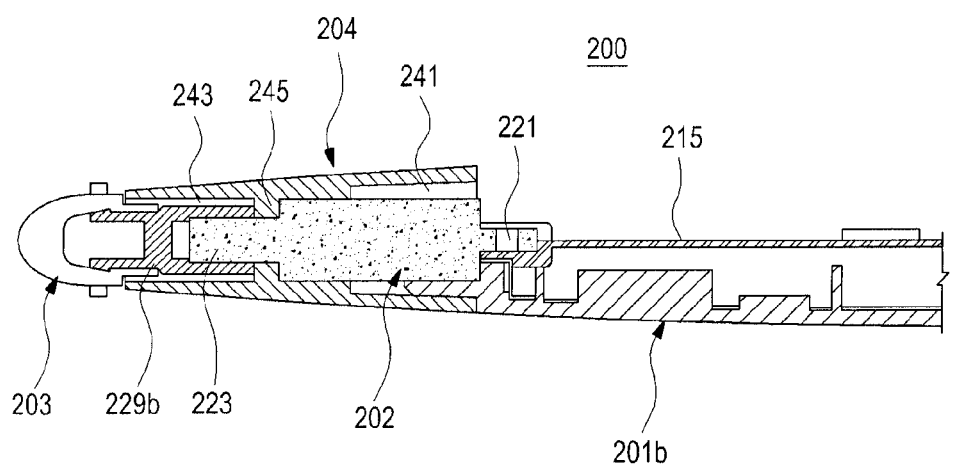
FIG. 5 is a cross-sectional view of a capacitive stylus pen shown in FIG. 4.

FIGS. 4 and 5 are views showing a capacitive stylus pen 200 according to another embodiment of the present invention. FIG. 4 is a plane view of a front case 201a and a rear case 201b of a body portion 201. FIG. 5 is a cross-sectional view of the stylus pen 200. It should be noted that the front case 201a is removed from the stylus pen 200 in the cross-sectional view shown in FIG. 5.

The capacitive stylus pen 200, like in the previous embodiment, includes a body portion 201, a sensing member 215, a transferring member 202, and a manipulating member 203.

In the front case 201a are formed a plurality of through-holes 211a, 211b, and 211c, which provide spaces for disposing a transmitter, a receiver, a communication start/end key, a volume control key, etc., respectively. On the rear case 201b is disposed a conductive plate as the sensing member 215. As is mentioned above, when the user holds the outer circumferential surface of the body portion 101, corresponding to a portion in which the sensing member 115 is provided, capacitive coupling is formed between the user's body and the sensing member 215, such that the sensing member 215 is conducted by the micro-current of the user's body.

The transferring member 202 is inserted into the lower end portion of the body portion 201 to contact the sensing member 215. A binding protrusion is formed as a binding member 229a on the body portion 201, and a binding hole 221 provided in an end of the transferring member 202 is engaged with the binding member 229a. Hence, the transferring member 202 is fixed to the body portion 201. When the transferring member 202 is fixed to the body portion 201, an end of the transferring member 202 is disposed to be deposited together with the sensing member 215.

Like in the previous embodiment, the manipulating member 203 is manufactured of conductive rubber and is arranged to enclose the transferring member 202 and the body portion 201. The stylus pen 200 according to the current embodiment further includes a grip member 204 to realize an elegant exterior.

The internal space of the grip member 204 is divided into a first receiving portion 241 and a second receiving portion 243 by a barrier 245. A connecting member 223 extends to another end of the transferring member 202. The connecting member 223 is positioned in the second receiving portion 243 through the barrier 245. The manipulating member 203 is received in the second receiving portion 243 to contact the connecting member 223. A second transferring member 229b is preferably included to firmly fix the grip member 204 to the body portion 201 and provide stable electrical connection between the manipulating member 203 and the transferring member 202.

The second transferring member 229b is engaged with the connecting member 223 in the second receiving portion 243. Preferably, the second transferring member 229b is screw-coupled to the connecting member 223. When the second transferring member 229b is completely coupled to the connecting member 223, the second transferring member 229b in the second receiving portion 243 pressurizes the barrier 245 toward the body portion 201. Thus, the grip member 204 is fixed to the body portion 201 by means of the second transferring member 229b while enclosing the transferring member 202 and the body portion 201. The grip member 204 and the second transferring member 229b are also manufactured of a conductive material.

The manipulating member 203, when received in the second receiving portion 243, is coupled to enclose the second transferring member 229b, thus being interposed between an inner circumferential surface of the second receiving portion 243 and an outer circumferential surface of the second transferring member 229b. The manipulating member 203 is manufactured of an elastic material. The manipulating member 203 forms a stable electrical connection structure with the second transferring member 229b and is firmly fixed to the grip member 204 as long as the manipulating member 203 is maintained compressed to some degree when coupled to the second receiving portion 243.

The capacitive stylus pen, as described above, is useful for manipulation of a capacitive touch screen because the micro-current of the human's body is transferred to the manipulating member through the sensing member or the grip member. The NFC device, such as a Bluetooth module, is embedded in the body portion of the capacitive stylus pen to perform wireless communication with the portable terminal, thereby configuring a wireless headset with the capacitive stylus pen. The body portion is manufactured of a synthetic resin material, facilitating communication between the NFC device and the portable terminal. Moreover, the sensing member for sensing the micro-current of the human's body is disposed only in a portion of the body portion. Hence, the stylus pen is easy to miniaturize even with the NFC device embedded therein and thus, simplifying accessories of the portable terminal.

While detailed embodiments has been described in the present invention, it would be obvious to those of ordinary skill in the art that various changes may be made without departing from the scope of the present invention.

For example, structures disclosed in the detailed embodiments of the present invention are exchangeable. For example, the coupling structure between the first screw 129b and the transferring member 102 may be replaced with the coupling structure between the second transferring member 229b and the transferring member 202.

Moreover, the transferring member, the manipulating member, and the grip member may be formed integrally as a single body. However, the manipulating member, because of directly contacting the touch screen of the portable terminal, is preferably manufactured of a flexible material so not to damage the surface of the touch screen.

Furthermore, while it has been described that the screw or protrusion in a form of a binding member is provided to fix the transferring member to the body portion, soldering or welding also may be used as fixing or binding means, taking into account electrical connection between the transferring member and the sensing member. However, since the body portion is manufactured of a synthetic resin material, care must be taken to avoid deforming the body portion during soldering or welding.

What is claimed is:

1. A capacitive stylus pen for a portable terminal, the capacitive stylus pen comprising:
    a body portion formed of a synthetic resin material and extending in a longitudinal direction;
    a sensing member provided in an inner side of the body portion to sense a current of a human's body upon gripping the body portion;
    a transferring member formed of a conductive material and provided in an end of the body portion to be connected to the sensing member; and
    a manipulating member provided in an end of the transferring member,
    wherein the manipulating member is manufactured of conductive rubber and is pressed against and contacts a touch screen according to user's manipulation;
    a binding hole provided in one end of the transferring member; and
    a binding member provided in an end of the body portion, wherein at least an end portion of the transferring member is inserted into the end of the body portion, and the binding member is engaged within the binding hole to fix the transferring member to the body portion.

2. The capacitive stylus pen of claim 1, wherein the binding member comprises a first screw engaged from an outer side of the body portion.

3. The capacitive stylus pen of claim 1, wherein the binding member comprises a binding protrusion formed on the inner circumferential surface of the body portion.

4. The capacitive stylus pen of claim 1, further comprising a near field communication (NFC) device embedded in the body portion to perform wireless communication.

5. A capacitive stylus pen for a portable terminal, the capacitive stylus pen comprising:
    a body portion formed of a synthetic resin material and extending in a longitudinal direction;
    a sensing member provided in an inner side of the body portion to sense a current of a human's body upon gripping the body portion;
    a first transferring member formed of a conductive material and provided in an end of the body portion to be connected to the sensing member;
    a manipulating member provided in an end of the first transferring member,
    wherein the manipulating member is manufactured of conductive rubber and is pressed against and contacts a touch screen according to user's manipulation; and
    a grip member arranged to enclose at least the first transferring member between the body portion and the manipulating member, wherein the grip member comprises:
        a first receiving portion for receiving a portion of the first transferring member;
        a second receiving portion for receiving a portion of the manipulating member; and
        a barrier provided between the first receiving portion and the second receiving portion, and wherein a binding member comprises a first screw engaged from an outer side of the body portion, further comprising a second screw engaged to the first transferring member from the second receiving portion through the barrier.

6. The capacitive stylus pen of claim 5, wherein the second screw is formed of a conductive material and the manipulating member contacts the second screw as the manipulating member is received in the second receiving portion.

7. The capacitive stylus pen of claim 5, further comprising:
a second transferring member disposed in the second receiving portion; and
a connecting member extending from the second transferring member to the second receiving portion through the barrier,
wherein the second transferring member is engaged to the connecting member.

8. The capacitive stylus pen of claim 7, wherein the second transferring member is formed of a conductive material and the manipulating member is coupled to the second transferring member in the second receiving portion.

* * * * *